United States Patent [19]

Takimoto

[11] Patent Number: 4,651,213
[45] Date of Patent: Mar. 17, 1987

[54] CLAMPING APPARATUS FOR A VIDEO SIGNAL
[75] Inventor: Hideki Takimoto, Tokyo, Japan
[73] Assignee: NEC Corporation, Japan
[21] Appl. No.: 675,192
[22] Filed: Nov. 27, 1984
[30] Foreign Application Priority Data
Nov. 24, 1983 [JP] Japan ................................ 58-221128
[51] Int. Cl.⁴ ............................................. H04N 5/18
[52] U.S. Cl. .................................... 358/172; 358/171
[58] Field of Search ................. 358/172, 171, 160, 34, 358/35

[56] References Cited
U.S. PATENT DOCUMENTS
4,124,869 11/1978 Heitmann ......................... 358/172 X
4,473,846 9/1984 Mackereth ........................... 358/172
4,562,471 12/1985 Eouzan et al. ...................... 358/172

Primary Examiner—Howard W. Britton
Assistant Examiner—Victor R. Kostak
Attorney, Agent, or Firm—Ostrolenk, Faber, Gerb & Soffen

[57] ABSTRACT

A feedback clamping circuit for producing a drift error free digital signal from an input analog video signal. The circuit includes a differential amplifier which receives the input analog signal and an error signal. At its output, the differential amplifier delivers a drift free analog video output. To produce the error signal, the output of the differential amplifier is digitized and supplied to a switching circuit. A reference signal is also supplied to the switching circuit. Alternatively, the switching circuit supplies the two signals it receives to a D/A and from there to first and second sample and hold circuits. A comparator compares the level of the two signals that are supplied by the switching circuit and produces the error signal from them. The video signal is sampled during its pedestal phase and the reference signal shortly thereafter. The difference amplifier adjusts its output to minimize the level of the error signal.

2 Claims, 2 Drawing Figures

CLAMPING APPARATUS FOR A VIDEO SIGNAL

BACKGROUND OF THE INVENTION

The present invention relates to a clamping circuit for a video signal, and more particularly to a clamping circuit which sets the pedestal level of a digital video signal produced by an analog-to-digital converter, in response to an input analog video signal.

When an analog video signal is converted into a digital video signal (PCM video signal), it is necessary to set the pedestal level of the converted digital video signal at a predetermined level. In a conventional clamping circuit, an ordinary keyed clamping circuit is arranged in front of an analog-to-digital (A/D) converter to set the pedestal level of the analog signal which is then subject to A/D conversion.

Known A/D converters are sufficiently accurate to permit a relative error in a quantizing step to be disregarded. However, such A/D converters still have a drift error throughout their quantization range. Further, there are individual characteristic variation in the marketed A/D converters.

Conventional clamping devices cannot compensate for drift errors and for individual parameter variations in given A/D conerters. Therefore, pedestal level changes or errors after the A/D conversion are unavoidable. Further, these changes produce other changes in the set-up level in the case where a plurality of digital video signals are processed in a production switcher or recorded in a video tape recorder, and, then, the processed or recorded digital video signal is restored into an analog video signal by a digital-to-analog (D/A) converter after blank insertion process. The net result is that these changes are apt to cause delicate changes in the brightness on a picture monitor since the pedestal level is the reference level (totally black picture) for the video signal.

SUMMARY OF THE INVENTION

Accordingly it is an object of the present invention to provide a clamping circuit which accurately sets the pedestal level in a digital video signal at a predetermined level and which compensates for A/D converter induced drifts and errors.

According to the present invention, there is provided a clamping circuit for a video signal, comprising: a differential amplifier for receiving an input video signal through one input terminal thereof; an A/D converter for converting the output of the differential amplifier into a digital video signal; means for separating a synchronizing signal from the input video signal and producing a position pulse at a phase corresponding to the back porch of the synchronizing signal; a comparator for generating a differential signal representative of the difference between a pedestal level extracted from the digital video signal in accordance with the position pulse and a predetermined reference level; and means for feeding back the differential signal of the comparator to the other input terminal of the differential amplifier; whereby the pedestal level of the digital video signal is accurately set to a predetermined reference level.

DESCRIPTION OF THE PRIOR ART

Figure 1:
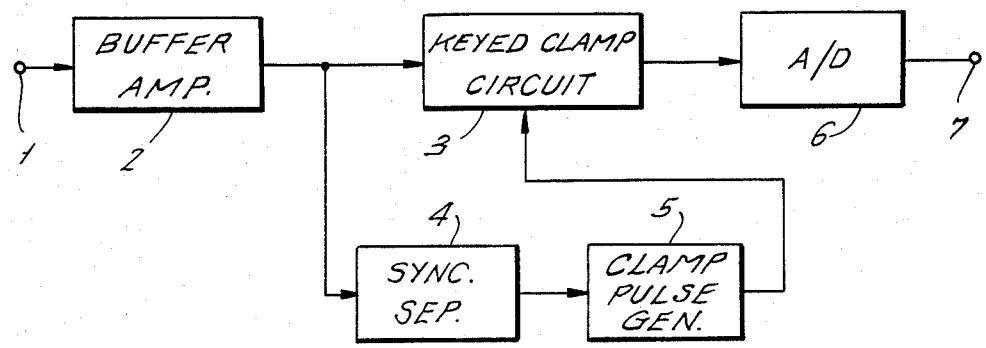
FIG. 1 shows a prior art clamping circuit for a video signal.

Referring to FIG. 1, the known clamping circuit, illustrated therein, includes an input analog video signal at an input terminal 1 supplied through a buffer amplifier 2 to a keyed clamping circuit 3 in which a pedestal level is set at a predetermined value in analog manner. The clamped video signal from the clamping circuit 3 is converted into a PCM video signal by an A/D converter 6 and, then, transmitted to an output terminal 7. In order to produce a clamp pulse, a synchronizing signal separator 4 separates a horizontal synchronizing signal and a clamp pulse generator 5 generates the clamp pulse at a phase corresponding to a back porch of the horizontal synchronizing signal. However, as described above, drifts and similar effects occur in the A/D converter 6, and, thus, it is impossible to exactly fix the pedestal value at a predetermined level in the output digital video signal.

DESCRIPTION OF THE PREFERRED EMBODIMENT

Figure 2:
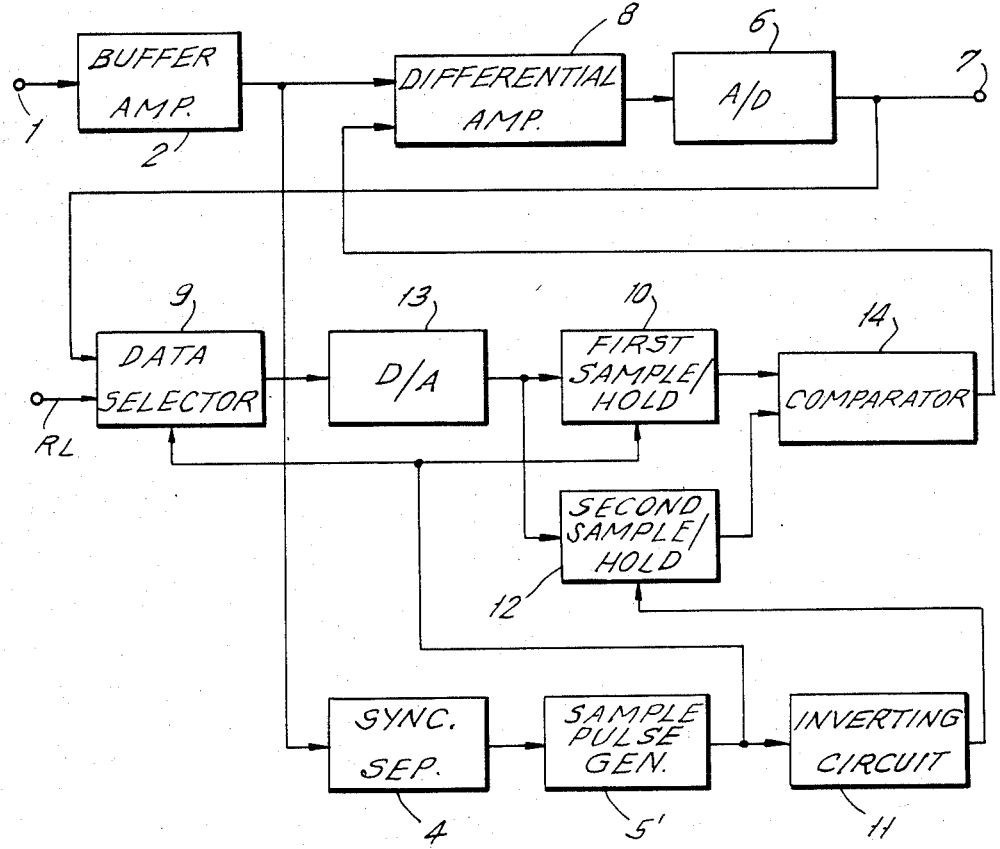
FIG. 2 is a block diagram of an embodiment according to the present invention.

Referring to FIG. 2 which shows an embodiment of the present invention, an input analog signal delivered from an input terminal 1 is supplied through a buffer amplifier 2 to one input terminal of a differential amplifier 8. A video signal from the differential amplifier 8 is converted into a digital (PCM) video signal in an A/D converter 6 and is output of an output terminal 7. A synchronizing signal separator 4 and a clamp pulse generator 5' cooperate to generate a pulse at the back porch of the horizontal synchronizing signal which serves as a sampling pulse.

In the embodiment, this sampling pulse is supplied to a data selector or switching circuit 9, a first sample/hold circuit 10, and an inverting circuit 11. In the inverting circuit 11, the sampling pulse is inverted and, then, supplied to a second sample/hold circuit 12.

The PCM video signal of the A/D converter 6 is supplied to the data switching circuit 9, which also receives a predetermined reference level signal RL. The reference level signal RL is a digital signal having a value equal to the standard pedestal level of an ideally quantized signal. The data switching circuit 9 passes the PCM video signal in response to the sample pulse, which occurs at an instant corresponding to the back porch, and, of the horizontal synchronization signal, passes the reference level signal RL of all other times. A D/A converter 13 converts the output data delivered from the switching circuit 9 into an analog signal. This converted analog signal is equal to the pedestal level of the PCM video signal at terminal 7 or the reference level signal RL, depending on the state of the output of clamp pulse generator 5'. The digital signal is supplied to the first and second sample/hold circuits 10 and 12.

The first sample/hold circuit 10 samples and holds the level corresponding to the pedestal level in the PCM video signal while the second sample/hold circuit 12 retains the level corresponding to the reference level RL. A comparator 14 compares the level from the first sample/hold circuit 10 and the level from the second sample/hold circuit 12. The output of the comparator is the difference between the pedestal level of the PCM video signal and the reference level RL. This output is independent of errors associated with the D/A converter 13 because the error is contained in both levels held in the first and second sample/hold circuits 10 and 12, and is cancelled by the comparator 14.

The comparator output, i.e., the difference between the pedestal level in the PCM video signal and the reference level RL is fed back to the other input terminal of the differential amplifier 8 so as to minimize the comparison result. As a result, the pedestal level in the PCM video signal is substantially fixed at the predetermined reference level.

As described above, the clamping circuit according to the invention, which directly compares the pedestal level in the PCM video signal after the quantization with the predetermined reference level of the pedestal, can compensate for any drift error which may occur in the A/D converter. Consequently, the present invention is very effective in stabilizing the pedestal level in a digital video signal.

What is claimed is:

1. A clamping circuit for a video signal comprising:
   (A) a differential amplifier for receiving an input analog video signal through one input terminal thereof and for producing an analog signal at an output terminal thereof;
   (B) means for converting said analog signal at said output terminal of said differential amplifier into a digital video signal;
   (C) comparator means for producing a difference signal representative of the difference between a pedestal level in said digital video signal and a predetermined reference level said comparator means comprising:
      (1) a separator circuit for separating a synchronizing signal from said input analog video signal;
      (2) a sampling pulse generator responsive to said synchronizing signal for generating a sample pulse during the occurrence of said pedestal level;
      (3) a switching circuit for alternatively delivering said digital video signal or said predetermined reference level in response to said sample pulse;
      (4) a digital-to-analog converter for converting the output of said switching circuit into an analog signal;
      (5) first means for sampling and holding said analog signal delivered from said digital-to-analog converter in response to said sample pulse;
      (6) second means for sampling and holding said analog signal delivered from said digital-to-analog converter at a time other than during the occurrence of said sample pulse; and
      (7) a comparator for comparing the outputs delivered from said first and second holding means and for producing said difference signal in response thereto; and
   (D) means for feeding back said difference signal to another input of said differential amplifier to minimize said difference signal.

2. A circuit for reducing errors associated with the conversion of an input video signal to a digital signal representative thereof, said circuit comprising:
   (A) means responsive to said input video signal for producing a sample pulse when said input video signal is in its pedestal level;
   (B) comparator means for comparing the value of said digital signal during the occurrence of said sample pulse to a reference level and for producing a difference signal representative of said comparison;
   (C) a difference amplifier having a first input coupled to said input video signal, a second input which receives said difference signal and an output; and
   (D) an analog-to-digital converter coupled to said output of said differential amplifier for producing said digital signal, the output of said differential amplifier being adjusted to minimize said difference signal, said comparator means including:
      (1) a switching circuit for alternatively delivering said digital video signal or a reference data corresponding to said reference level in response to said sample pulse;
      (2) a digital-to-analog converter for converting the output of said switching circuit into an analog signal;
      (3) first means for sampling and holding said analog signal delivered from said digital-to-analog converter in response to said sample pulse;
      (4) second means for sampling and holding said analog signal delivered from said digital-to-analog converter at a time other than during the occurrence of said sample pulse; and
      (5) a comparator for comparing the outputs delivered from said first and second holding means and for producing said difference signal.

* * * * *